(12) United States Patent
Dietrich

(10) Patent No.: US 10,737,351 B2
(45) Date of Patent: Aug. 11, 2020

(54) APPARATUS AND METHOD FOR MANUFACTURING AN ANTI-COUNTERFEIT THREE-DIMENSIONAL ARTICLE

(71) Applicant: The Boeing Company, Chicago, IL (US)

(72) Inventor: David M. Dietrich, Knoxville, TN (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/052,297

(22) Filed: Aug. 1, 2018

(65) Prior Publication Data

US 2018/0354062 A1 Dec. 13, 2018

Related U.S. Application Data

(62) Division of application No. 14/613,504, filed on Feb. 4, 2015, now Pat. No. 10,065,264.

(51) Int. Cl.
  *B23K 15/00* (2006.01)
  *B23K 26/342* (2014.01)
  (Continued)

(52) U.S. Cl.
  CPC ...... *B23K 15/0086* (2013.01); *B22F 3/105* (2013.01); *B22F 3/1055* (2013.01); *B23K 15/0006* (2013.01); *B23K 26/342* (2015.10); *B23K 26/702* (2015.10); *B29C 64/10* (2017.08); *B32B 5/30* (2013.01); *B32B 15/01* (2013.01); *B33Y 10/00* (2014.12); *B33Y 30/00* (2014.12); *B33Y 50/02* (2014.12); *B33Y 80/00* (2014.12); *B33Y 99/00* (2014.12); *B41M 3/00* (2013.01); *G06K 9/00577* (2013.01);
  (Continued)

(58) Field of Classification Search
  CPC .................. B22F 3/105; B29C 64/10
  USPC ........................................ 428/195.1
  See application file for complete search history.

(56) References Cited

U.S. PATENT DOCUMENTS

2002/0166896 A1* 11/2002 Mazumder ............... G06K 1/12
                                                                      235/487
2012/0183701 A1*  7/2012 Pilz ....................... B22F 3/1055
                                                                      427/504

(Continued)

FOREIGN PATENT DOCUMENTS

CN       102574331      7/2012
DE   10 2009 043317     3/2011
(Continued)

OTHER PUBLICATIONS

Canadian Intellectual Property Office, Office Action, App. No. 2,914,172 (dated Dec. 21, 2018).
(Continued)

*Primary Examiner* — Betelhem Shewareged
(74) *Attorney, Agent, or Firm* — Walters & Wasylyna LLC

(57) ABSTRACT

An additively manufactured three-dimensional article includes layers successively built up from a metal powder by an additive manufacturing process by scanning a selected portion of the metal powder with electromagnetic radiation, and an anti-counterfeiting mark formed in at least one layer of the layers during the additive manufacturing process.

20 Claims, 8 Drawing Sheets

(51) Int. Cl.

| | |
|---|---|
| *B23K 26/70* | (2014.01) |
| *B32B 15/01* | (2006.01) |
| *B32B 5/30* | (2006.01) |
| *B41M 3/00* | (2006.01) |
| *B33Y 10/00* | (2015.01) |
| *B33Y 30/00* | (2015.01) |
| *B33Y 80/00* | (2015.01) |
| *B22F 3/105* | (2006.01) |
| *G06K 19/08* | (2006.01) |
| *B33Y 99/00* | (2015.01) |
| *G06K 9/00* | (2006.01) |
| *B33Y 50/02* | (2015.01) |
| *B29C 64/10* | (2017.01) |

(52) U.S. Cl.
CPC .... *G06K 19/086* (2013.01); *B22F 2003/1056* (2013.01); *B22F 2003/1057* (2013.01); *Y02P 10/295* (2015.11)

(56) References Cited

U.S. PATENT DOCUMENTS

| | | | |
|---|---|---|---|
| 2015/0147585 A1 | 5/2015 | Schwarze et al. | |
| 2018/0354062 A1* | 12/2018 | Dietrich | B23K 15/0086 |

FOREIGN PATENT DOCUMENTS

| | | |
|---|---|---|
| EP | 2 875 932 | 5/2015 |
| JP | 2013-505855 | 2/2013 |
| JP | 2015-120197 | 7/2015 |
| WO | WO 2005/099635 | 10/2005 |

OTHER PUBLICATIONS

China National Intellectual Property Administration, Examination Report, with English translation, App. No. 201610072533.X (dated Sep. 29, 2019).

China National Intellectual Property Administration, Office Action, with English translation, App. No. 201610072533.X (dated Nov. 5, 2018).

Dehoff, "Processing Science Related to the Electron Beam Melting Additive Manufacturing Process," U.S. Department of Energy, Oak Ridge National Laboratory (Oct. 14, 2014).

Williams et al., "Selective Laser Sintering Part Strength as a Function of Andrew Number, Scan Rate and Spot Size," *Proceedings of Solid Freeform Fabrication Symposium*, pp. 549-557 (1996).

Hornick, "How to Tell What's Real and What's Fake in a 3D Printed World," *3D Printing Industry* (Feb. 5, 2014).

European Patent Office, "Extended European Search Report", App. No. 16153587.7 (dated Jun. 17, 2016).

China National Intellectual Property Administration, "Notification of Second Office Action," App. No. 201610072533.X (dated Jun. 24, 2019).

Canadian Intellectual Property Office, Office Action, App. No. 2,914,172 (dated Oct. 18, 2019).

Japan Patent Office, Office Action, with English translation, App. No. 2016-017316 (dated Feb. 4, 2020).

* cited by examiner

APPARATUS AND METHOD FOR MANUFACTURING AN ANTI-COUNTERFEIT THREE-DIMENSIONAL ARTICLE

PRIORITY

This application is a divisional of U.S. Ser. No. 14/613,504 filed on Feb. 4, 2015.

FIELD

The present disclosure is generally related to additive manufacturing and, more particularly, to three-dimensional articles having anti-counterfeit authentication and apparatuses for additively manufacturing the same.

BACKGROUND

Additive manufacturing, often referred to as 3D printing, builds a solid, often geometrically complex object from a series of layers, each one "printed" on top of the previous one. In contrast to more conventional, "subtractive" processes, such as CNC milling or machining, additive manufacturing enables fast, flexible and cost-efficient production of three-dimensional objects from three-dimensional computer aided design (3D CAD) data.

Recently, additive manufacturing has become an attractive solution for the manufacturing of metallic functional components. Additive manufacturing methods use a powder material as a base material. The manufactured component is generated directly from a powder bed. Additive manufacturing techniques allow for the manufacture of high performance and complex shaped parts due to the capability to generate very sophisticated designs directly from the powder bed.

However, as additive manufacturing technology improves, it provides a perfect tool for counterfeiters. Not only is it possible for counterfeit products to be manufactured and sold on the consumer market; unknown to the original equipment manufacturer (OEM), counterfeit components may also make their way into the OEM supply chain of genuine products.

Traditional anti-counterfeiting labeling techniques are unsuitable for metal components. This is because metal parts have a higher melting temperature than any ink or polymer that would be used to label the part. Other anti-counterfeiting labeling or marker techniques, such as embedded nanoparticles, stamping, coatings, adhesives in drilled holes, or DNA markings, increase the cost and process time of manufacturing the part.

Accordingly, those skilled in the art continue with research and development efforts in the field of additive manufacturing.

SUMMARY

In an embodiment, the disclosed additively manufactured three-dimensional article includes layers successively built up from a metal powder by an additive manufacturing process by scanning a selected portion of the metal powder with electromagnetic radiation, and an anti-counterfeiting mark formed in at least one layer of the layers during the additive manufacturing process.

In another embodiment, the disclosed additively manufactured three-dimensional article includes layers successively built up from a metal powder by an additive manufacturing process, defined by at least one process parameter, by scanning a selected portion of the metal powder with electromagnetic radiation to establish an article microstructure of the article following solidification of the selected portion of the metal powder. The additively manufactured three-dimensional article further includes an anti-counterfeiting mark formed in at least one layer of the layers during the additive manufacturing process, defined by a modification of the at least one process parameter, by scanning another selected portion of the metal powder with the electromagnetic radiation to establish an anti-counterfeiting mark microstructure of the anti-counterfeiting mark following solidification of the another selected portion of the metal powder. The article microstructure and the anti-counterfeiting mark microstructure are different.

In yet another embodiment, the disclosed additive manufacturing apparatus includes an electromagnetic radiation source configured to emit electromagnetic radiation, an imaging system, a processor connected to the electromagnetic radiation source and the imaging system, and a non-transitory computer-readable storage medium containing instructions, that when executed by the processor (1) generates a three-dimensional model representing a three-dimensional article, (2) generates an anti-counterfeiting image, (3) combines the anti-counterfeiting image with the three-dimensional model, (4) successively builds up the article from a metal powder by an additive manufacturing process by scanning the metal powder with the electromagnetic radiation based on the three-dimensional model, (5) forms an anti-counterfeiting mark in the article during the additive manufacturing process by scanning a selected portion of the metal powder with the electromagnetic radiation based on the anti-counterfeiting image, and (6) determines whether the article includes the anti-counterfeiting mark by examining the article with the imaging system during the additive manufacturing process.

Other embodiments of the disclosed article, apparatuses, and methods will become apparent from the following detailed description, the accompanying drawings and the appended claims.

DETAILED DESCRIPTION

Figure 1:
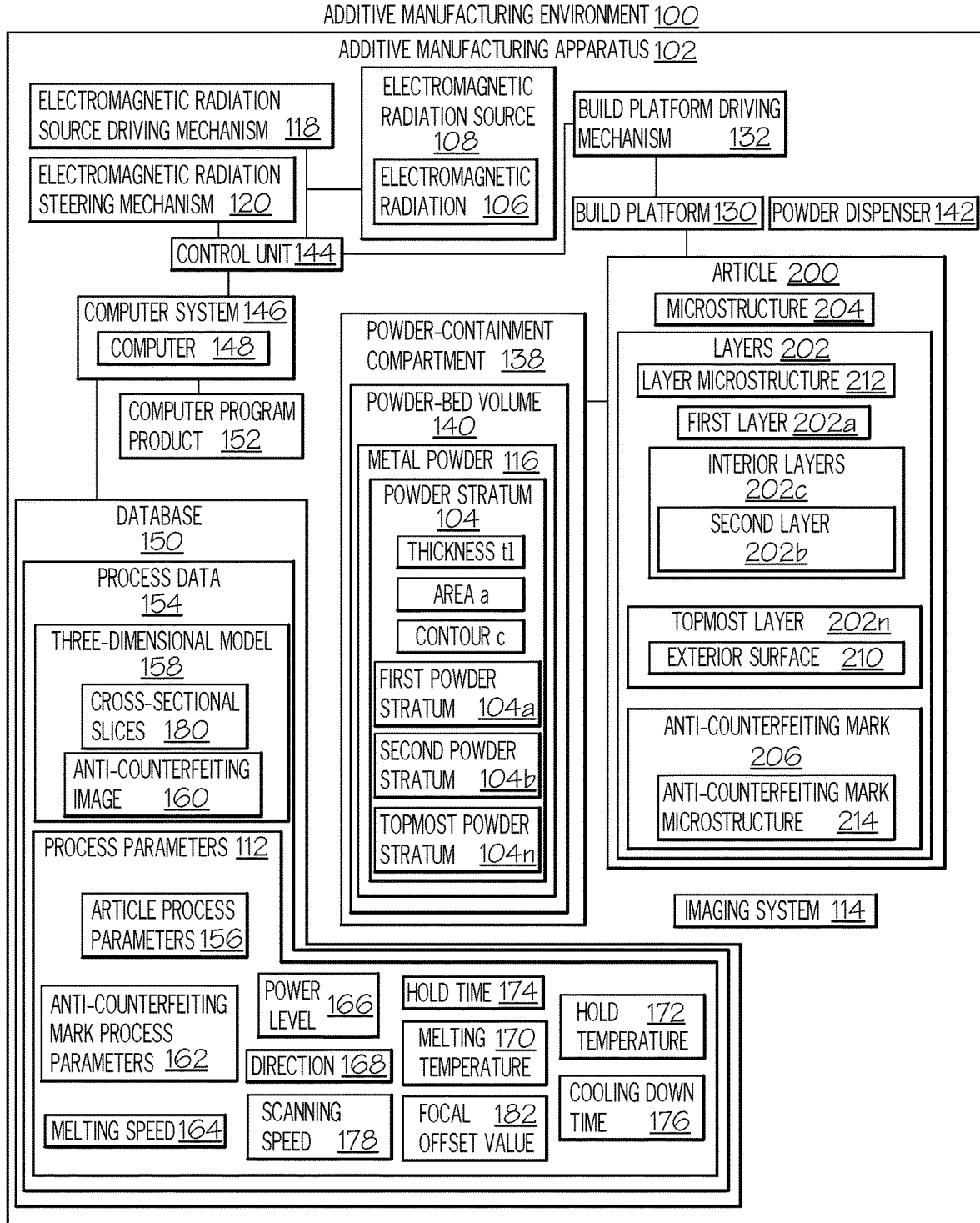
FIG. 1 is a block diagram of one embodiment of the disclosed additive manufacturing environment.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

FIG. 1 illustrates one embodiment of additive manufacturing environment 100. Three-dimensional article (herein generally designated "article" 200) may be manufactured by additive manufacturing apparatus (herein generally designated "apparatus" 102).

As used herein, the term "article" refers to any three-dimensional object, part, component, product or the like having almost any shape or geometry and produced by an additive manufacturing process. An additive manufacturing process includes any process or operation for manufacturing a three-dimensional article in which successive layers of a base material are laid down, for example, under computer control.

Apparatus 102 may include electromagnetic radiation source 108. Article 200 may be manufactured by successive addition of powder stratums 104 of a predetermined thickness t1, area a, and/or contour c, which are melted by electromagnetic radiation 106 of electromagnetic radiation source 108.

Powder stratums 104 may include a base material. As one example, the base material of powder stratums 104 may include metal powder 116. Metal powder 116 includes any metal or metal alloy in powder form. Thus, as one example, apparatus 102 may be used to manufacture article 200 made of metal. As one example, metal powder 116 may include the same material as article 200. For instance, metal powder 116 may be a pure material having no additional filler materials. As another example, metal powder 116 may include additional materials different than the material of article 200. For instance, metal powder 116 may include additional filler materials.

Electromagnetic radiation source 108 may generate and/or emit electromagnetic radiation 106 capable of irradiating metal powder 116 of powder stratum 104 to form a solid homogeneous mass of material (e.g., article 200). Electromagnetic radiation 106 may take the form of a concentrated beam of electromagnetic radiation or energy. Apparatus 102 utilizes electromagnetic radiation source 108, for example, under computer control, to form article 200 by selectively melting metal powder 116 layer-by-layer into a solid, homogeneous metal mass with electromagnetic radiation 106.

As one general, non-limiting example, electromagnetic radiation source 108 may include an electron beam generator (e.g., electron beam melting ("EBM")). The electron beam generator generates and/or emits an electron beam (e.g., electromagnetic radiation 106) capable of selectively melting metal powder 116 to form article 200.

As another general, non-limiting example, electromagnetic radiation source 108 may include a laser beam generator (e.g., selective laser melting ("SLM")). The laser beam generator generates and/or emits a laser beam (e.g., electromagnetic radiation 106) capable of selectively melting metal powder 116 to form article 200.

The electron beam generator and/or the laser beam generator used in the additive manufacturing process may produce (e.g., generate and/or emit) a sufficient amount of radiation energy (e.g., electron beam or laser beam, respectively) to promote melting of metal powder 116. Advantageously, article 200 produced by the additive manufacturing process (e.g., electron beam melting or laser melting techniques) is fully dense, void-free, and extremely strong.

Figure 2:
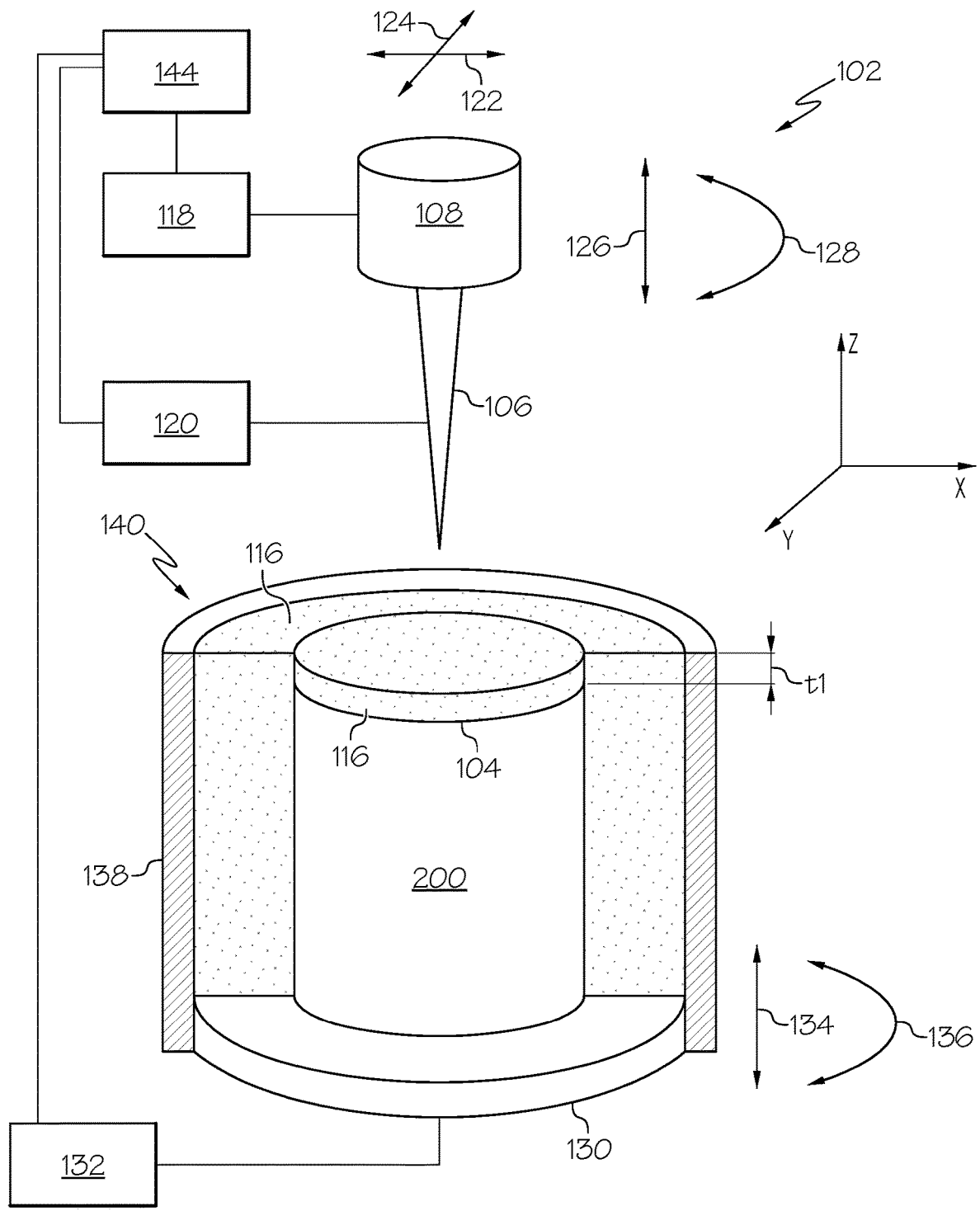
FIG. 2 is a schematic perspective view of the disclosed additive manufacturing apparatus of FIG. 1.

Referring to FIG. 1, and with reference to FIG. 2, electromagnetic radiation source 108 may be movable relative to article 200 (or build platform 130) during the additive manufacturing process. Movement of electromagnetic radiation source 108 relative to article 200 may appropriately position electromagnetic radiation source 108 and, thus, electromagnetic radiation 106, for selective melting of metal powder 116 (e.g., at least a portion of powder stratum 104).

As one example, electromagnetic radiation source 108 may be linearly movable relative to article 200 (or build platform 130). For instance, electromagnetic radiation source 108 may be linearly moved along an X-axis (e.g., in the direction of arrow 122), linearly moved along a Y-axis (e.g., in the direction of arrow 124), linearly moved along a Z-axis (e.g., in the direction of arrow 126) or a combination thereof.

As another example, electromagnetic radiation source 108 may be rotatably movable relative to article 200 (or build platform 130). For instance, electromagnetic radiation source 108 may be rotatably moved about the Z-axis (e.g., in the direction of arrow 128).

As another example, electromagnetic radiation source 108 may be non-linearly moveable relative to article 200 (or build platform 130). For instance, electromagnetic radiation source 108 may be freely moved relative to article 200, for example, to form complex shapes.

Apparatus 102 may further include electromagnetic radiation source driving mechanism 118. Electromagnetic radiation source driving mechanism 118 may be operatively coupled to electromagnetic radiation source 108. As general, non-limiting examples, electromagnetic radiation source driving mechanism 118 may include any suitable mechanical, electro-mechanical, hydraulic or pneumatic mechanism configured to drive motion (e.g., linear, rotatable, and/or non-linear) of electromagnetic radiation source 108 relative to article 200. As other general, non-limiting examples, electromagnetic radiation source driving mechanism 118 may include robotic mechanisms, end-effectors, autonomous vehicles and/or other related technologies configured to drive motion (e.g., linear, rotatable, and/or non-linear) of electromagnetic radiation source 108 relative to article 200.

Referring to FIG. 1, and with reference to FIG. 2, electromagnetic radiation 106 may be steered relative to article 200. Steering electromagnetic radiation 106 may appropriately control a melting profile of metal powder 116 during selective melting of metal powder 116 (e.g., at least a portion of powder stratum 104).

As one example, electromagnetic radiation 106 may be linearly steerable relative to article 200 (or build platform 130). For instance, electromagnetic radiation 106 may be linearly steered along the X-axis (e.g., in the direction of arrow 122), linearly steered along the Y-axis (e.g., in the direction of arrow 124), linearly steered along the Z-axis (e.g., in the direction of arrow 126) or a combination thereof.

As another example, electromagnetic radiation 106 may be non-linearly steerable relative to article 200. For instance, electromagnetic radiation 106 may be freely steered relative to article 200, for example, to form complex shapes.

Apparatus 102 may further include electromagnetic radiation steering mechanism 120. Electromagnetic radiation steering mechanism 120 may be operatively coupled to electromagnetic radiation 106. As one general, non-limiting example, electromagnetic radiation steering mechanism 120 may include an electromagnetic steering mechanism configured to control the location, position and/or orientation of the electron beam or otherwise steer the electron beam. As another general, non-limiting example, electromagnetic radiation steering mechanism 120 may include mechanical galvo mirrors configured to control the location, position and/or orientation of the laser beam or otherwise steer the laser beam. As other general, non-limiting examples, electromagnetic radiation steering mechanism 120 may include robotic mechanisms, end-effectors, autonomous vehicles and/or other related technologies configured to control the location, position and/or orientation of electromagnetic radiation 106 or otherwise steer electromagnetic radiation 106.

Referring to FIG. 1, and with reference to FIG. 2, apparatus 102 may further include build platform 130. Build platform 130 provides a build surface to support metal powder 116 and article 200, additively manufactured therefrom. Movement of build platform 130 relative to electromagnetic radiation source 108 may appropriately position powder stratum 104 for selective melting of metal powder 116 (e.g., at least a portion of powder stratum 104). Movement of build platform 130 relative to electromagnetic radiation source 108 may facilitate successive layering of metal powder 116 (e.g., additional powder stratums 104) upon build platform 130 and/or article 200.

As one example, build platform 130 may be linearly movable relative to electromagnetic radiation source 108. For instance, build platform 130 may be linearly (e.g., vertically) moved along the Z-axis (e.g., in the direction of arrow 134).

As another example, build platform 130 may be rotatably movable relative to electromagnetic radiation source 108. For instance, build platform 130 may be rotatably moved about the Z-axis (e.g., in the direction of arrow 136).

Apparatus 102 may further include build platform driving mechanism 132. Build platform driving mechanism 132 may be operatively coupled to build platform 130. Build platform driving mechanism 132 may include any suitable mechanical, electro-mechanical, hydraulic or pneumatic mechanism configured to drive motion (e.g., linear and/or rotatable) of build platform 130 relative to electromagnetic radiation source 108.

Figure 3:
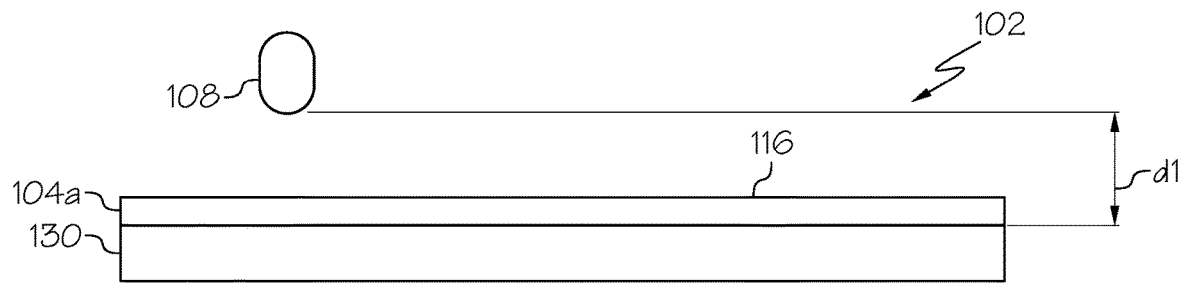
FIG. 3 is a schematic side elevation view of one embodiment of an electromagnetic radiation source and a build platform of the additive manufacturing apparatus of FIG. 1.
Figure 4:
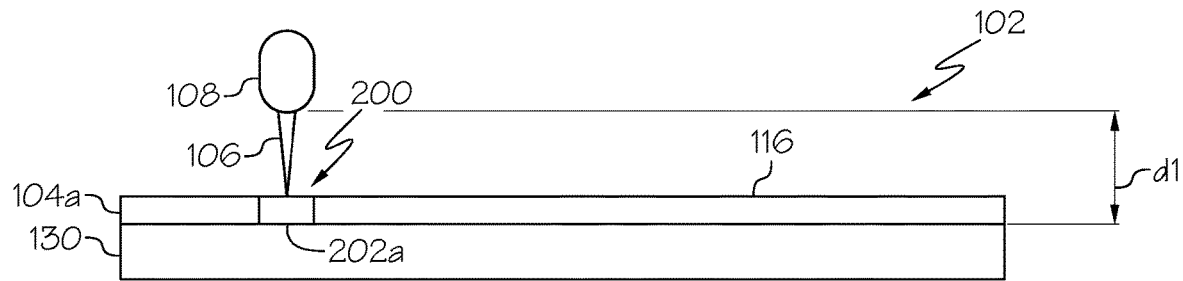
FIG. 4 is a schematic side elevation view of the electromagnetic radiation source and the build platform of the additive manufacturing apparatus of FIG. 3 illustrating formation of a first layer of an additively manufactured three-dimensional article.

Referring to FIGS. 3 and 4, as one example, during the additive manufacturing operation, build platform 130 may be positioned vertical distance d1 away from electromechanical radiation source 108. First powder stratum 104*a* of metal powder 116 may be distributed upon build platform 130, as illustrated in FIG. 3. Electromagnetic radiation 106 may melt a selected portion of metal powder 116 of first powder stratum 104*a* to form first layer 202*a* of article 200, as illustrated in FIG. 4.

Figure 5:
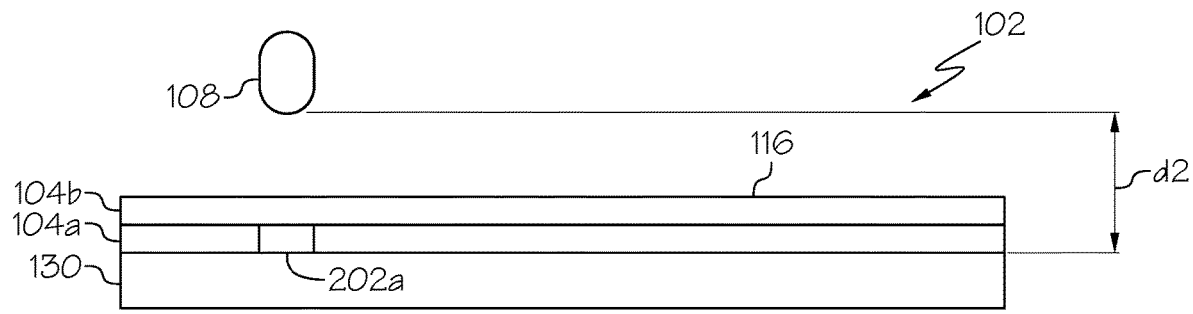
FIG. 5 is a schematic side elevation view of the electromagnetic radiation source and the build platform of the additive manufacturing apparatus of FIG. 4.
Figure 6:
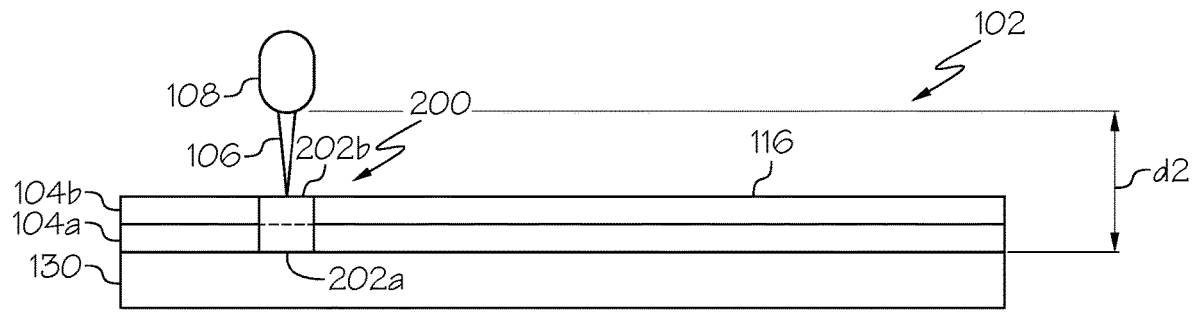
FIG. 6 is a schematic side elevation view of the electromagnetic radiation source and the build platform of the additive manufacturing apparatus of FIG. 5 illustrating formation of a second layer of the additively manufactured three-dimensional article.

Referring to FIGS. 5 and 6, build platform 130 may then vertically move away from electromagnetic radiation source 108 to vertical distance d2. Second powder stratum 104*b* of metal powder 116 may be distributed upon build platform 130 and/or upon at least a portion of article 200, as illustrated in FIG. 5. Electromagnetic radiation 106 may melt a selected portion of metal powder 116 of second powder stratum 104*b* to form second layer 202*b* of article 200.

Unless otherwise indicated, the terms "first," "second," etc. are used herein merely as labels, and are not intended to impose ordinal, positional, or hierarchical requirements on the items to which these terms refer. Moreover, reference to a numbered item (e.g., a "second" item) does not require or preclude the existence of a lower-numbered item (e.g., a "first" item) and/or a higher-numbered item (e.g., a "third" item).

Each successive (e.g., additional) layer 202 is formed upon a preceding layer 202 to form a solid homogeneous mass in order to form article 200. Accordingly, those skilled in the art will recognize that the dashed line separating first layer 202*a* and second layer 202*b* in FIG. 6 is solely for the purpose of illustrating the disclosed embodiments of the additive manufacturing process and does not imply any separation (e.g., physical or structural separation) between layers 202 forming article 200.

Those skilled in the art will recognize that as build platform 130 moves vertically away from electromagnetic radiation source 108, the difference between vertical distance d2 and vertical distance d1 may defines the thickness t1 of each powder stratum 104 and, thus, a thickness of each layer 202. The thickness t1 of each powder stratum 104 and, thus, the thickness of each layer 202 may also be defined by various other factors depending upon, for example, the method for dispensing metal powder 116 as powder stratum 104 upon build platform 130 and/or article 200, the relative motion of build platform 130 and/or electromagnetic energy source 108, the particular type of electromagnetic radiation 106, the movement of electromagnetic radiation 106, process parameters 112 and the like.

Referring to FIG. 1, and with reference to FIG. 2, apparatus 102 may further include powder-containment compartment 138. Powder-containment compartment 138 is configured to contain metal powder 116. Powder-containment compartment 138 defines at least a portion of powder-bed volume 140. Similarly, build platform 130 at least partially delimits powder-bed volume 140. As one example, metal powder 116 is contained by powder-containment compartment 138 when deposited upon build platform 130.

Build platform 130 may be linearly movable (e.g., in the direction of arrow 134) within powder-containment compartment 138. Linearly (e.g., vertically) moving build platform 130 within powder-containment compartment 138 varies powder-bed volume 140. Thus, powder-bed volume 140 is variable based on the position of build platform 130. As one example, as build platform 130 moves away from electromagnetic radiation source 108, powder-bed volume 140 increases, thereby facilitating distribution of additional metal powder 116 to form additional powder stratums 104 and formation of additional layers 202 of article 200.

Referring to FIG. 1, apparatus 102 may further include powder dispenser 142. Powder dispenser 142 may be configured to deposit metal powder 116 into powder-containment compartment 138, onto build platform 130 and/or onto article 200 in successive layers to form powder stratums 104 (e.g., first powder stratum 104*a*, second powder stratum 104*b*, etc.) (FIGS. 3-6). As one example, powder dispenser 142 deposits metal powder 116 as powder stratum 104 having a uniform thickness on build platform 130 and/or on a previously processed powder stratum 104 (e.g., preceding layer 202 of article 200). Generally, powder dispenser 142 may include any mechanism, device or system configured to receive metal powder 116 from a powder source and feed metal powder 116 from the powder source to build platform 130.

Referring to FIG. 1, and with reference to FIG. 2, apparatus 102 may further include control unit 144. Control unit 144 may be in communication with and configured to control electromagnetic radiation source 108, electromagnetic radiation source driving mechanism 118, electromagnetic radiation steering mechanism 120, build platform driving mechanism 132 and/or powder dispenser 142.

Figure 7:
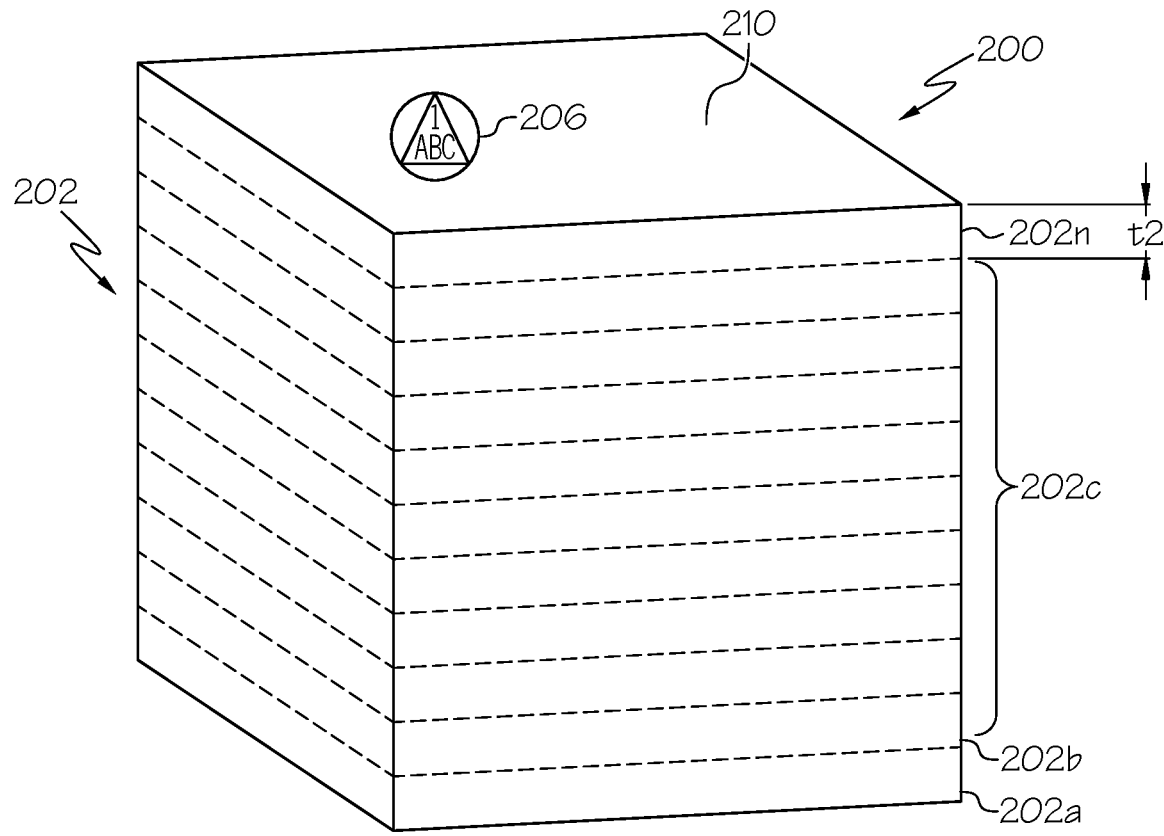
FIG. 7 is a schematic perspective view of one embodiment of the disclosed additively manufactured three-dimensional article of FIG. 1.

Referring to FIG. 7, and with reference to FIG. 1, article 200 includes a solid, homogeneous mass formed from the base material (e.g., metal powder 116). Article 200 is grown layer by layer by irradiating (e.g., melting and cooling) successive powder stratums 104 (FIG. 1) of metal powder 116. Thus, embodiments of the additive manufacturing process disclosed herein may be defined as essentially a melting and solidification process of the base material (e.g., metal powder 116) to form article 200.

Generally, article 200 is formed by a plurality of successive layers 202. As one example, and as best illustrated in FIG. 7, article 200 may include first (e.g., base) layer 202a, one or more interior layers 202c (e.g., second layer 202b and any additional layers 202 disposed between first layer 202b and topmost layer 202n) and topmost (e.g., final) layer 202n. Each successive (e.g., additional) layer 202 may be formed upon a preceding layer 202 (e.g., second layer 202b may be formed upon first layer 202a, third layer may be formed upon second layer 202b, etc.) to form the solid, homogeneous article 200. The total number of layers 202 built up to form article 200 may vary depending upon, for example, the shape, size and/or geometry of article 200, without limitation. Accordingly, those skilled in the art will recognize that the dashed lines separating layers 202 in FIG. 7 is solely for the purpose of illustrating the disclosed embodiments of the additive manufacturing process used to form article 200 and does not imply any separation (e.g., physical or structural separation) between layers 202 forming article 200.

Referring to FIG. 7, and with reference to FIG. 1, article 200 may include anti-counterfeiting mark 206. Anti-counterfeiting mark 206 may be formed in article 200 during creation or formation of article 200 by embodiments of the additive manufacturing process (e.g., in situ). As one example, and as best illustrated in FIG. 7, anti-counterfeiting mark 206 may be formed in at least a portion of topmost layer 202n, for example, proximate (e.g., at or near) exterior surface 210 of article 200. For instance, anti-counterfeiting mark 206 may be formed in exterior surface 210 and extend at least partially through the thickness of article 200 (e.g., topmost layer 202n). For another instance, anti-counterfeiting mark 206 may be formed in interior layer 202c directly preceding topmost layer 202n and extend at least partially through the thickness of article 200 and topmost layer 202n may be a protective (e.g., very thin) layer, through which anti-counterfeiting mark 206 is identifiable. In either instance, article 200 may include a protective (and e.g., substantially clear) coating (not shown) covering exterior surface 210 and/or anti-counterfeiting mark 206, through which anti-counterfeiting mark 206 is identifiable. In such an example, anti-counterfeiting mark 206 may be identifiable through examination, for example, through microscopy, of an exterior (e.g., exterior surface 210) of article 200 (e.g., viewable from outside of article 200) in order to authentic article 200.

As another example (not shown), anti-counterfeiting mark 206 may be formed in at least a portion of one or more interior layers 202c of article 200. For instance, anti-counterfeiting mark 206 may be formed within and extend at least partially through the thickness of article 200. In such an example, anti-counterfeiting mark 206 may be identifiable through examination, for example, through microscopy, of an interior of article 200 (e.g., not viewable from outside of article 200) in order to authentic article 200.

Referring to FIG. 1, and with reference to FIG. 7, article 200 includes an overall microstructure 204, each layer 202 includes layer microstructure 212 and anti-counterfeiting mark 206 includes anti-counterfeiting mark microstructure 214. Microstructure 204 of article 200, layer microstructure 212 and/or anti-counterfeiting mark microstructure 214 may be formed (e.g., created), for example, by the melting profile of metal powder 116 as the selected portion of each powder stratum 104 melts, the directional solidification of the melted metal powder 116 as the selected portion of each powder stratum 104 cools to form layer 202 and/or other appropriate factors, for example, as defined by process parameters 112.

As used herein, "microstructure" generally refers to the fine structure of a material, usually visible through a microscope (rather than by eye), and sometimes after some form of surface preparation such as the polishing or etching of metal or metal alloys.

Thus, microstructure 204 of article 200 may be the physical structure, physical features, grain structure and/or orientation (e.g., of the solidified metal powder 116 forming article 200) and/or variations or changes therein of article 200, for example, as seen through microscopy and/or examined by metallography. Layer microstructure 212 may be the physical structure, physical features, grain structure and/or orientation (e.g., of the solidified metal powder 116 forming layer 202) and/or variations or changes therein of layer 202, for example, as seen through microscopy and/or examined by metallography. Anti-counterfeiting mark microstructure 214 may be the physical structure, physical features, grain structure and/or orientation (e.g., of the solidified metal powder 116 forming anti-counterfeiting mark 206) and/or variations or changes therein of anti-counterfeiting mark 206, for example, as seen through microscopy and/or examined by metallography.

Anti-counterfeiting mark 206 is formed or defined by variations in microstructure. As one example, anti-counterfeiting mark 206 may be formed by varying microstructure 204 of at least a portion of article 200. As another example, anti-counterfeiting mark 206 may be formed by varying layer microstructure 212 of at least a portion of at least one layer 202 (e.g., interior layer 202c or topmost layer 202n) of article 200.

Microstructure 204 of article 200 (or layer microstructure 212 of each layer 202 of article 200) may be controlled by setting and/or manipulating various process parameters 112. By modifying and/or manipulating process parameters 112 during formation of article 200, article 200 may include a uniform or homogeneous microstructure 204 (e.g., each layer 202 of article 200 includes the same layer microstructure 212) or a non-uniform or inhomogeneous microstructure 204 (e.g., one or more layers 202 of article 200 includes a different layer microstructure 212). By modifying and/or manipulating process parameters 112 during formation of article 200, at least a portion of at least one layer 202 (e.g., interior layer 202c or topmost layer 202n) of article 200 may include anti-counterfeiting mark microstructure 214 that is different from layer microstructure 212 of layer 202 (or overall microstructure 204 of article 200).

For example, process parameters 112 may include, but are not limited to, melting speed 164 of metal powder 116, power level 166 (e.g., energy output) of electromagnetic radiation 106, direction 168 of electromagnetic radiation 106, melting temperature 170 of metal powder 116, hold temperature 172 of the melted metal powder 116, hold time 174 of the melted metal powder 116, cool down time 176 to solidify metal powder 116, scanning velocity 178 of electromagnetic radiation source 108 (e.g., the speed at which electromagnetic radiation source 108 travels relative to powder stratum 104) and/or focal offset value 182 (e.g., an adjustment from the known convergence of focal distance for optimized spot density).

As one example, anti-counterfeiting mark 206 and, thus, anti-counterfeiting mark microstructure 214 may extend through part or all of the thickness t2 (FIG. 7) of topmost layer 202n of article 200. As another example, anti-counterfeiting mark 206, and thus, anti-counterfeiting mark microstructure 214 may extend through part or all of the thickness of one or more interior layers 202c. As yet another example, anti-counterfeiting mark 206, and thus, anti-counterfeiting mark microstructure 214 may extend through the thickness t2 of topmost layer 202n and part or all of the thickness of one or more interior layers 202c directly adjacent to topmost layer 202n (e.g., through a part or all of the through-thickness of article 202).

Those skilled in the art will recognize that the thickness of any layer 202 (e.g., the thickness t2 of topmost layer 202n) may be defined by the thickness of a corresponding powder stratum 104 (e.g., the thickness t1 of topmost powder stratum 104n). As one example, anti-counterfeiting mark 206 and, thus, anti-counterfeiting mark microstructure 214, may range from a minimum of one layer thickness (e.g., advantageously 0.010 inch (0.254 mm)) to a maximum of the through-thickness of article 200. As another example, anti-counterfeiting mark 206 and, thus, anti-counterfeiting mark microstructure 214, may range from a minimum of less than one layer thickness to a maximum of one layer thickness.

The thickness of a given layer 202 and the extent through which anti-counterfeiting mark 206 and, thus, anti-counterfeiting mark microstructure 214 extends through a given layer 202 is not limited to these thickness ranges. For example, the thickness of a given layer 202 may only be limited by the thickness of a corresponding powder stratum 104, the particular additive manufacturing apparatus 102 (e.g., the type of electromagnetic radiation source 108 and/or electromagnetic radiation 106) used for the additive manufacturing process and/or process parameters 112 of the additive manufacturing process. Thus, the thickness of any given layer 202 could be much thinner or much thicker than the example thickness range.

Article process parameters 156 may be utilized to form all layers 202 of article 200 (e.g., first layer 202a through topmost layer 202n) such that article 200 includes the overall article microstructure 204 (e.g., defined by the combination of layer microstructures 212). Article process parameters 156 may be the same for each layer 202 or may be varied for one or more layers 202.

For example, article process parameters 156 may be one example of process parameters 112 and may include, but are not limited to, melting speed 164 of metal powder 116 of each successive powder stratum 104, power level 166 (e.g., energy output) of electromagnetic radiation 106 applied to metal powder 116 of each successive powder stratum 104, direction 168 of electromagnetic radiation 106 applied to metal powder 116 of each successive powder stratum 104, melting temperature 170 of metal powder 116 of each successive powder stratum 104, hold temperature 172 of the melted metal powder 116 of each successive powder stratum 104, hold time 174 of the melted metal powder 116 of each successive powder stratum 104, cool down time 176 to solidify metal powder 116 of each successive powder stratum 104, scanning speed 178 of electromagnetic radiation 106 of each successive powder stratum 104 and/or focal offset value 182.

Anti-counterfeiting mark process parameters 162 may be utilized to form anti-counterfeiting mark 206 in one or more layers 202 (e.g., interior layer 202c, topmost layer 202n or a combination thereof) of article 200 such at least a portion of one or more layers 202 includes anti-counterfeiting mark microstructure 214 that is different than layer microstructure 212 of those one or more layers 202. Thus, anti-counterfeiting mark process parameters 162 may be different from article process parameters 156.

For example, anti-counterfeiting mark process parameters 162 may be one example of process parameters 112 and may include, but are not limited to, melting speed 164 of a selected portion of metal powder 116 of one or more successive powder stratums 104 (e.g., topmost powder stratum 104n, a preceding powder stratum or a combination thereof), power level 166 (e.g., energy output) of electromagnetic radiation 106 applied to the selected portion of metal powder 116 of one or more successive powder stratums 104, direction 168 of electromagnetic radiation 106 applied to the selected portion of metal powder 116 of one or more successive powder stratums 104, melting temperature 170 of the selected portion of metal powder 116 of one or more successive powder stratums 104, hold temperature 172 of the melted selected portion of metal powder 116 of one or more successive powder stratums 104, hold time 174 of the melted selected portion of metal powder 116 of one or more successive powder stratums 104, cool down time 176 to solidify the selected portion of metal powder 116 of one or more successive powder stratums 104, scanning speed 178 of electromagnetic radiation 106 of a selected portion of one or more successive powder stratums 104 and/or focal offset value 182.

Thus, microstructure 204 of article 200 may include roughly the same grain orientation and/or physical structure, for example, as seen with microscopy. For example, layer microstructure 212 may be repeated throughout formation of article 200 (e.g., layer 202 by layer 202) such that the grain orientation and/or physical structure of article 200, for example, as seen with microscopy, are generally the same throughout the through-thickness of article 200. Anti-counterfeiting mark microstructure 214 may include a different (e.g., a variation in) grain orientation and/or physical structure (e.g., defined by purposeful manipulation of process parameters 112) to achieve a pre-determined representation such as one of the following marks, but not limited to these: a shape, a pattern, a textured area, an image, text, numbers and/or code and that is advantageously visible by the eye, microscope or other detection device.

Figure 8:
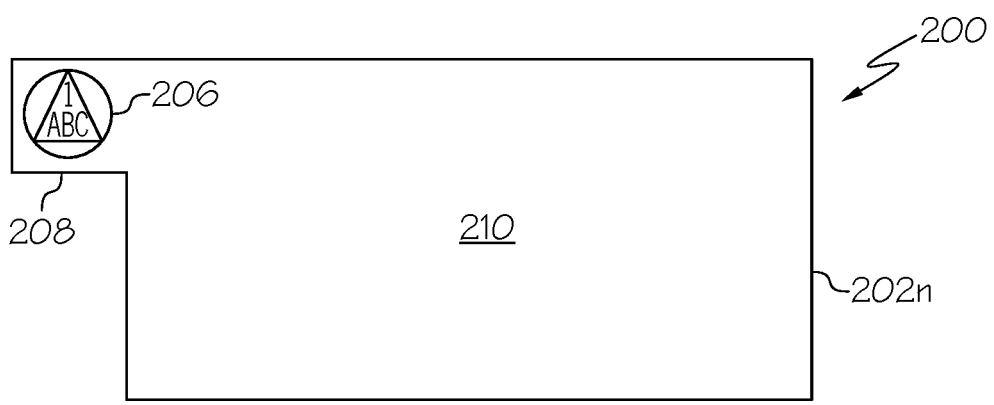
FIG. 8 is a schematic top plan view of one embodiment of the disclosed additively manufactured three-dimensional article of FIG. 1.

Referring to FIG. 8, article 200 may be additively manufactured to include tab 208. Tab 208 may be formed by selectively melting and cooling a portion of a selected powder stratum 104 (e.g., topmost powder stratum 104n, one or more preceding powder stratums 104 or a combination thereof) (FIG. 1). Thus, tab 208 may be an extension of one or more layers 202 (e.g., first layer 202a, topmost layer 202n, one or more interior layers 202c or a combination thereof) of article 200. As one example, tab 208 may include a thickness equivalent to or greater than the thickness of one layer 202 (e.g., the thickness t2 of topmost layer 202n).

Anti-counterfeiting mark 206 may be formed in tab 208. Tab 208 may include layer microstructure 212 and anti-counterfeiting mark 206 may include anti-counterfeiting mark microstructure 214 different than layer microstructure 212 of tab 208. Tab 208 may be easily removed from article 200 once authenticity of article 200 has been established or verified without damaging or otherwise altering the functional use of article 200.

Referring to FIGS. 7 and 8, and with reference to FIG. 1, anti-counterfeiting mark 206 may include any suitable marking that may verify the authenticity of article 200. For example, anti-counterfeiting mark 206 may include, but is not limited to, an image (e.g., a logo), a symbol, a string of one or more alphabetic characters, a string of one or more numeric characters, a bar code, a QR code, a combination thereof or any other representative form, for example, that includes branding elements.

The size (e.g., the two-dimensional surface area) of anti-counterfeiting mark 206 (e.g., on exterior surface 210 or interior of article 200 upon which anti-counterfeiting mark 206 is formed) may vary advantageously from a relatively small size (e.g., in the range of millimeters, microns or less) to a relatively large size (e.g., in the range of centimeters, inches or more). The size of anti-counterfeiting mark 206 (e.g., from very small to very large) may depend on various factors including, but not limited to, the size and/or function of article 200, the form represented by anti-counterfeiting mark 206, the type and/or configuration of imaging system 114 used to identify anti-counterfeiting mark 206 during authentication of article and the like.

Because anti-counterfeiting mark 206 is formed by a difference between or variation in anti-counterfeiting mark microstructure 214 and layer microstructure 212 of layer 202 (or article microstructure 204), when anti-counterfeiting mark 206 is formed proximate the exterior of article 200 (e.g., in exterior surface 210 of topmost layer 202n), anti-counterfeiting mark 206 is not visible to the human eye or under normal magnification (e.g., less than 25× magnification) from outside of article 200. Similarly, when anti-counterfeiting mark 206 is formed in the interior of article 200 (e.g., in one or more interior layers 202c), anti-counterfeiting mark 206 is not visible to the human eye or under normal magnification from outside of article 200. Thus, imaging system 114 (FIG. 1) may be utilized to view anti-counterfeiting mark 206 and authenticate article 200 as genuine.

Imaging system 114 may include any imaging or scanning system capable of viewing layer microstructure 212 (or article microstructure 204) and anti-counterfeiting microstructure 214 on a microscopic level (e.g., greater than 25× magnification) to identify variations there between. As one example, imaging system 114 may include an imaging or scanning system capable of viewing anti-counterfeiting mark 206 (e.g., inhomogeneity between layer microstructure 212 and anti-counterfeiting mark microstructure 214) on the exterior of article 200. As another example, imaging system 114 may include an imaging or scanning system capable of viewing anti-counterfeiting mark 206 (e.g., inhomogeneity between layer microstructure 212 and anti-counterfeiting mark microstructure 214) in the interior of article 200. As a general, non-limiting example, scanner 114 may include any suitable microscopy system or device. As specific, non-limiting examples, imaging system 114 may include, but is not limited to an optical microscopy system, an electron microscopy system, a scanning probe microscopy system, an ultraviolet microscopy system, an infrared microscopy system, a laser microscopy system, an x-ray microscopy system or the like.

Referring to FIG. 1, embodiments of apparatus 102 described herein may include computer system 146 and/or computer program product 152 (e.g., a software-based tool or application) for implementation of embodiments of the additive manufacturing process disclosed herein. Control unit 144 may be in communication with computer system 146. Computer system 146 and/or computer program product 152 may utilize process data 154 to additively manufacture article 200.

Computer program product 152 may be implemented by computer system 146. Computer system 146 may include one or more computers 148. When more than one computer 148 is present in computer system 146, computers 148 may be in communication with each other over a communications medium (e.g., using wired and/or wireless communications links or computer network).

Process data 154 may include any process information, process controls, process inputs, process factors, base material characteristics and the like that are utilized to form article 200 by the additive manufacturing process. Process data 154 may be stored and/or shared within database 150. For example, database 150 may act as a repository for process data 154. Computer system 146 may be in communication with database 150 to access process data 154.

As general, non-limiting example, process data 154 may include process parameters 112 (e.g., article process parameters 156 and/or anti-counterfeit mark process parameters 162, three-dimensional model 158 of article 200 and/or anti-counterfeit image 160 of anti-counterfeit mark 206.

Three-dimensional model 158 may be a 3D CAD image (e.g., a virtual representation) of article 200. As one specific, non-limiting example, three-dimensional model 158 may include a STereoLithography (STL) file format. Three-dimensional model 158 may be utilized by computer system 146 and/or control unit 144 to form article 200. As one example, three-dimensional model 158 may be generated by a stereolithography CAD software application. As another example, three-dimensional model 158 may be generated by computer program product 152.

Three-dimensional model 158 may be processed, for example, by computer program product 152, to provide instructions to control unit 144 regarding the selected portion of metal powder 116 of each powder stratum 104 to selectively irradiate (e.g., melt) with electromagnetic radiation 106. As one example, three-dimensional model 158 may be sliced into a plurality of cross-sections (e.g., cross-sectional slices 180) representing each layer 202 of article 200.

Anti-counterfeit image 160 may be a 3D CAD image (e.g., a virtual representation) of anti-counterfeit mark 206. As one specific, non-limiting example, anti-counterfeit image 160 may include a STereoLithography (STL) file format. Anti-counterfeit image 160 may be utilized by computer system 146 and/or control unit 144 to form anti-counterfeit mark 206 in one or more layers 202 of article 200. As one example, anti-counterfeit image 160 may be generated by a stereolithography CAD software application. As another example, anti-counterfeit image 160 may be generated by computer program product 152.

Anti-counterfeit image 160 may be processed, for example, by computer program product 152, to provide instructions to control unit 144 regarding the selected portion of metal powder 116 of one or more powder stratums 104 to selectively irradiate (e.g., melt) with electromagnetic radiation 106.

The illustrated embodiment of additive manufacturing environment 100 in FIG. 1 is not meant to provide physical or architectural limitations to the manner in which different embodiments may be implemented. Other components in addition to and/or in place of the ones illustrated may be used. Some components may be unnecessary in some example embodiments. Also, the blocks are presented to illustrate some functional components. One or more of these blocks may be combined and/or divided into different blocks when implemented in different embodiments.

Figure 9A:
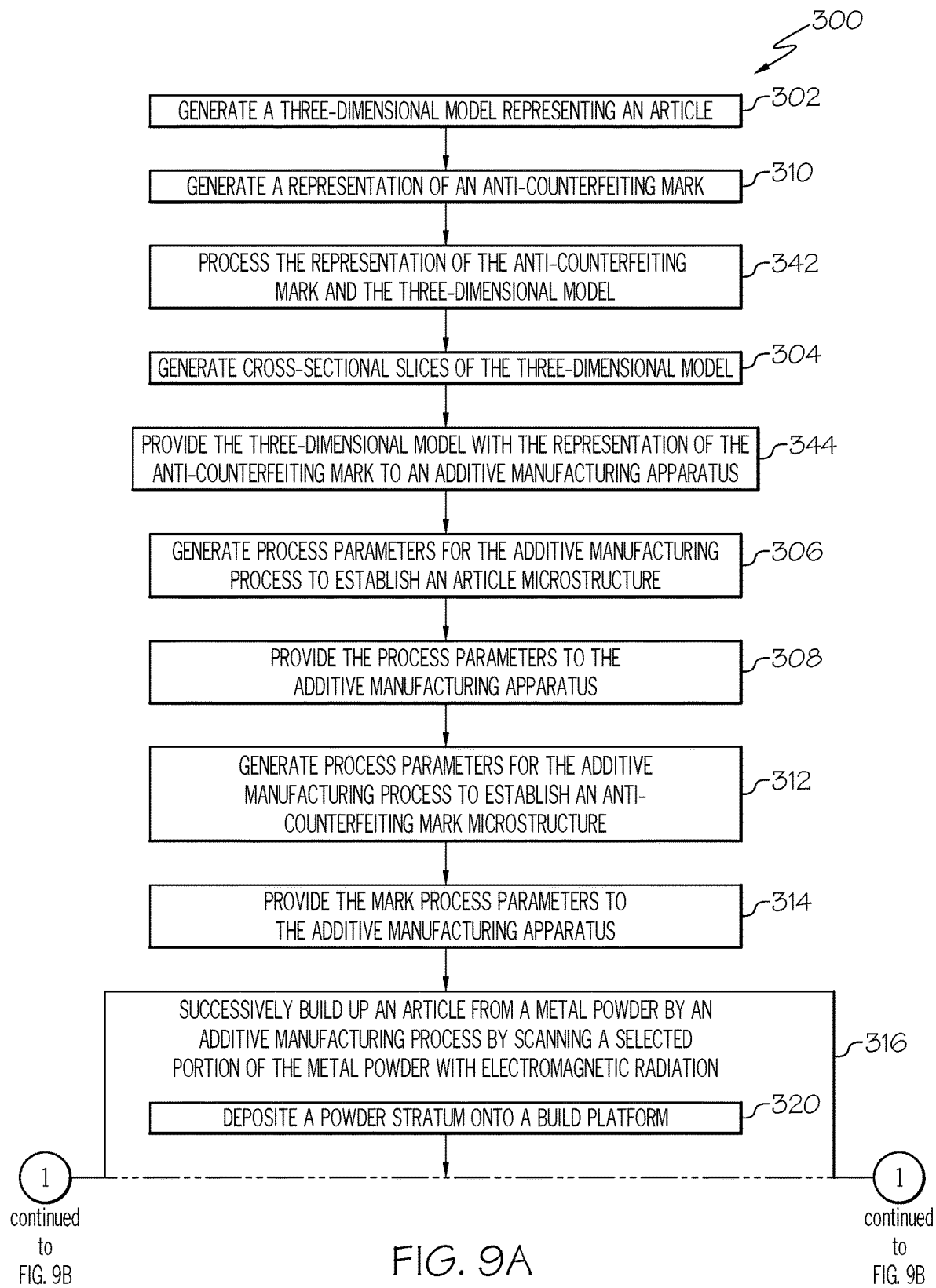
FIG. 9A is a first portion of a flow diagram of one embodiment of the disclosed method for additively manufacturing a three-dimensional article.
Figure 9B:
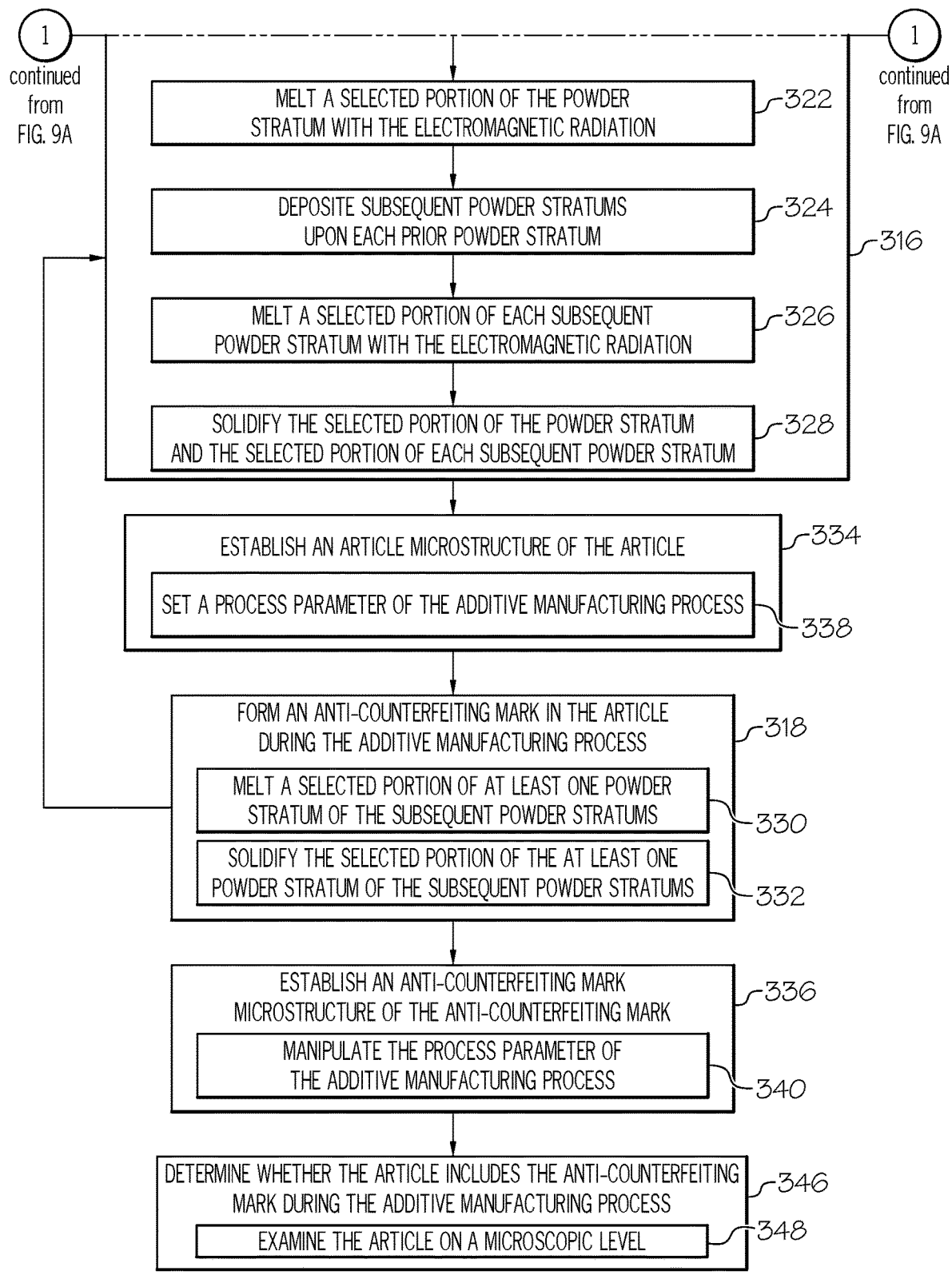
FIG. 9B is a second portion of the flow diagram of one embodiment of the disclosed method for additively manufacturing a three-dimensional article.

Referring to FIGS. 9A and 9B, and with reference to FIG. 1, one embodiment of the disclosed method, generally designated 300, for manufacturing a three-dimensional article with anti-counterfeiting mark may begin with the step of generating three-dimensional model 158 representing article 200, as shown at block 302. As shown at block 310, method 300 may further include the step of generating a representation of anti-counterfeiting mark 206. As one example, the representation of anti-counterfeiting mark 206 may include anti-counterfeiting image 160.

As shown at block 342, method 300 may further include the step of processing or merging the representation of anti-counterfeiting mark 206 (e.g., anti-counterfeiting image 160) and three-dimensional model 158, for example, by computer program product 152, such that three-dimensional model 158 represents both article 200 and anti-counterfeit mark 206 (e.g., model with representation of anti-counterfeit image 160 integrated or included within representation of article 200).

As shown at block 304, method 300 may further include the step of generating cross-sectional slices 180 of three-dimensional model 158, as shown at block 304. Thus, one or more cross-sectional slices 180 corresponding to one or more layers 202 may include at least a portion of the representation of the anti-counterfeiting mark 206 (e.g., anti-counterfeit image 160). For example, cross-sectional slice 180 may represent at least one layer 202 and at least a portion of anti-counterfeiting mark 206.

As shown at block 344, method 300 may further include the step of providing three-dimensional model 158 with the representation of anti-counterfeiting mark 206 (e.g., anti-counterfeiting image 160) to additive manufacturing apparatus 102 (e.g., from computer system 146 to control unit 144). For example, a plurality of cross-sectional slices 180 corresponding to or representing one or more layers 202 and anti-counterfeiting mark 206 may be provided to additive manufacturing apparatus 102.

As shown at block 306, method 300 may further include the step of generating process parameters 112 (e.g., article process parameters 156) for the additive manufacturing process to establish article microstructure 204 of article 200 (or layer microstructure 212 of one or more layers 202).

As shown at block 308, method 300 may further include the step of providing process parameters 112 (e.g., one or more article process parameters 156) to additive manufacturing apparatus 102 (e.g., from computer system 146 to control unit 144).

As shown at block 312, method 300 may further include the step of generating process parameters 112 (e.g., anti-counterfeiting mark process parameters 162) for the additive manufacturing process to establish anti-counterfeiting mark microstructure 214 of anti-counterfeiting mark 206.

As shown at block 314, method 300 may further include the step of providing varied or manipulated process parameters 112 (e.g., anti-counterfeiting mark process parameters 162) to additive manufacturing apparatus 102 (e.g., from computer system 146 to control unit 144).

As shown at block 316, method 300 may further include the step of successively building up article 200 from metal powder 116 by the additive manufacturing process by scanning a selected portion of metal powder 116 with electromagnetic radiation 106.

As shown at block 318, method 300 may further include the step forming anti-counterfeiting mark 206 in article 200 during the additive manufacturing process (e.g., in situ).

As used herein, "scanning" generally refers to the irradiating or otherwise subjecting the selected portion of metal powder 116 (e.g., of powder stratum 104) with electromagnetic radiation 106. The selected portion of metal powder 116 scanned by electromagnetic radiation 106 to form each layer 202 of article 200 may correspond to a cross-section of article 200 according to cross-sectional slices 180 of three-dimensional model 158. The selected portion of metal powder 116 scanned by electromagnetic radiation 106 to form anti-counterfeiting mark 206 of article 200 may correspond to a portion of the cross-section of article 200 according to cross-sectional slices 180 of three-dimensional model 158 including anti-counterfeiting image 160.

As shown at block 320, the step of building up article 200 (block 316) may include the step of depositing powder stratum 104 onto build platform 130.

As shown at block 322, the step of building up article 200 (block 316) may further include melting a selected portion of powder stratum 104 with electromagnetic radiation 106.

As shown at block 324, the step of building up article 200 (block 316) may further include depositing subsequent powder stratums 104 upon each prior powder stratum 104.

As shown at block 326, the step of building up article 200 (block 316) may further include melting a selected portion of each subsequent powder stratum 104 with electromagnetic radiation 106.

As shown at block 328, the step of building up article 200 (block 316) may further include solidifying (e.g., cooling or curing) the selected portion of powder stratum 104 and the selected portion of each subsequent powder stratum 104 to form article 200 including anti-counterfeiting mark 206.

As one example implementation, the step of building up article 200 (block 316) may include depositing first powder stratum 104a onto build platform 130. A selected portion of metal powder 116 of first powder stratum 104a (e.g., corresponding to cross-sectional slice 180 representing first layer 202a) may be melted with electromagnetic radiation 106 to form first layer 202. Second powder stratum 104b may be deposited upon first layer 202a and first powder stratum 104a. A selected portion of metal powder 116 of second powder stratum 104b (e.g., corresponding to cross-sectional slice 180 representing second layer 202b) may be melted with electromagnetic radiation to form second layer 202b. Any number of additional interior powder stratums 104 may be deposited upon immediately previous powder stratums 104, for example, until reaching the last cross-sectional slice 180 according to three-dimensional model 158. Topmost powder stratum 104n (e.g., corresponding to cross-sectional slice 180 representing topmost layer 202n) may be deposited upon an immediately previous interior layer 202c and powder stratums 104. A selected portion of metal powder 116 of topmost powder stratum 104n (e.g., corresponding to cross-sectional slice 180 representing topmost layer 202n) may be melted with electromagnetic radiation 106 to form topmost layer 202n. The selected portion of metal powder 116 of first powder stratum 104a, second powder stratum 104b, any additional interior powder stratums 104 and topmost powder stratum 104n may be solidified so that first layer 202a, second layer 202b, any additional interior layers 202c and topmost layer 202n bond together.

As shown at block 330, the step of forming anti-counterfeiting mark 206 (block 318) may include the step of melting a selected portion of at least one powder stratum 104 of subsequent powder stratums 104 with electromagnetic radiation 106.

As shown at block 332, the step of forming anti-counterfeiting mark 206 (block 318) may further include solidifying the selected portion of at least one powder stratum 104 of subsequent powder stratums 104 to form anti-counterfeiting mark 206 in article 200.

As one example implementation, the step of forming anti-counterfeiting mark 206 (block 318) may include the step of melting a selected portion of metal powder 116 of topmost powder stratum 104n (e.g., corresponding to cross-sectional slice 180 representing topmost layer 202n with anti-counterfeiting image 160) to form anti-counterfeiting mark 206 in topmost layer 202n of article 200. As another example implementation, the step of forming anti-counterfeiting mark 206 (block 318) may include the step of melting a selected portion of metal powder 116 of at least one interior powder stratum 104 (e.g., corresponding to cross-sectional slice 180 representing at least one interior layer 202c with anti-counterfeiting image 160) to form anti-counterfeiting mark 206 in at least one interior layer 202c of article 200.

Those skilled in the art will appreciate that the step of building up article 200 (block 316) and the step of forming anti-counterfeiting mark 206 (block 318) may occur substantially concurrently. For example, the steps of melting and solidifying the selected portions of at least one powder stratum 104 of subsequent powder stratums 104 to form at least one layer 202 (e.g., at least one interior layer 202c, topmost layer 202n or a combination thereof) and anti-counterfeiting mark 206 in the at least one layer 202 may occur concurrently during the additive manufacturing process for the corresponding layer 202.

As shown at block 334, method 300 may further include the step of establishing article microstructure 204 of article 200 (or layer microstructure 212 of each layer 202).

As shown at block 336, method 300 may further include the step of establishing anti-counterfeiting mark microstructure 214 of anti-counterfeiting mark 206. Anti-counterfeiting mark microstructure 214 may be different than or be a variation in article microstructure 204 (or layer microstructure 212 of one or more layers 202).

As shown at block 338, the step of establishing article microstructure 204 of article 200 (or layer microstructure 212 of each layer 202) (block 334) may include the step of setting one or more process parameters 112 (e.g., article process parameters 156) of the additive manufacturing process to generate or form article 200 having a predetermined article microstructure 204 (or layers 202 each having a predetermined layer microstructure 212).

As shown at block 340, the step of establishing anti-counterfeiting mark microstructure 214 of anti-counterfeiting mark 206 may include the step of manipulating one or more process parameters 112 (e.g., setting anti-counterfeiting mark process parameters 162) of the additive manufacturing process to generate or form anti-counterfeiting mark 206 in at least one layer 202 having a predetermined anti-counterfeiting mark microstructure 214.

As shown at block 346, method 300 may further include the step of determining whether article 200 includes anti-counterfeiting mark 206 in at least one layer 202 during the additive manufacturing process.

As shown at block 348, the step of determining whether article 200 includes anti-counterfeiting mark 206 (block 346) may include the step of examining or inspecting article 200 on a microscopic level, for example, using imaging system 114. As one example, following formation of at least one layer 202 of article 200 and anti-counterfeiting mark 206 in that layer 202, imaging system 114 may be used to visually inspect article 200 (e.g., the formed layer 202) in order to verify that anti-counterfeiting mark 206 was appropriately formed in the corresponding layer 202. As another example, following formation of article 200 (e.g., after formation of topmost layer 202n) and anti-counterfeiting mark 206 in at least one layer 202 (e.g., one or more interior layers 202c, topmost layer 202n or a combination thereof), imaging system 114 may be used to visually inspect article 200 in order to verify that anti-counterfeiting mark 206 was appropriately formed in the corresponding layer 202 within article.

Examination of article 200, for example, with imaging system 114, may identify any variations in anti-counterfeiting microstructure 214 and article microstructure 204 (or any layer microstructure 212).

Anti-counterfeiting mark microstructure 214 may include a microscopically perceptible variation compared to article microstructure 204 (or layer microstructure 212 of at least one layer 202), which may be used to authenticate article 200. As one example, anti-counterfeiting mark 206 may include at least one branding element (e.g., defined by anti-counterfeiting image 160) for authenticating article 200.

Modifications, additions, or omissions may be made to method 300 without departing from the scope of the present disclosure. Method 300 may include more, fewer, or other steps. Additionally, steps may be performed in any suitable order.

Figure 10:
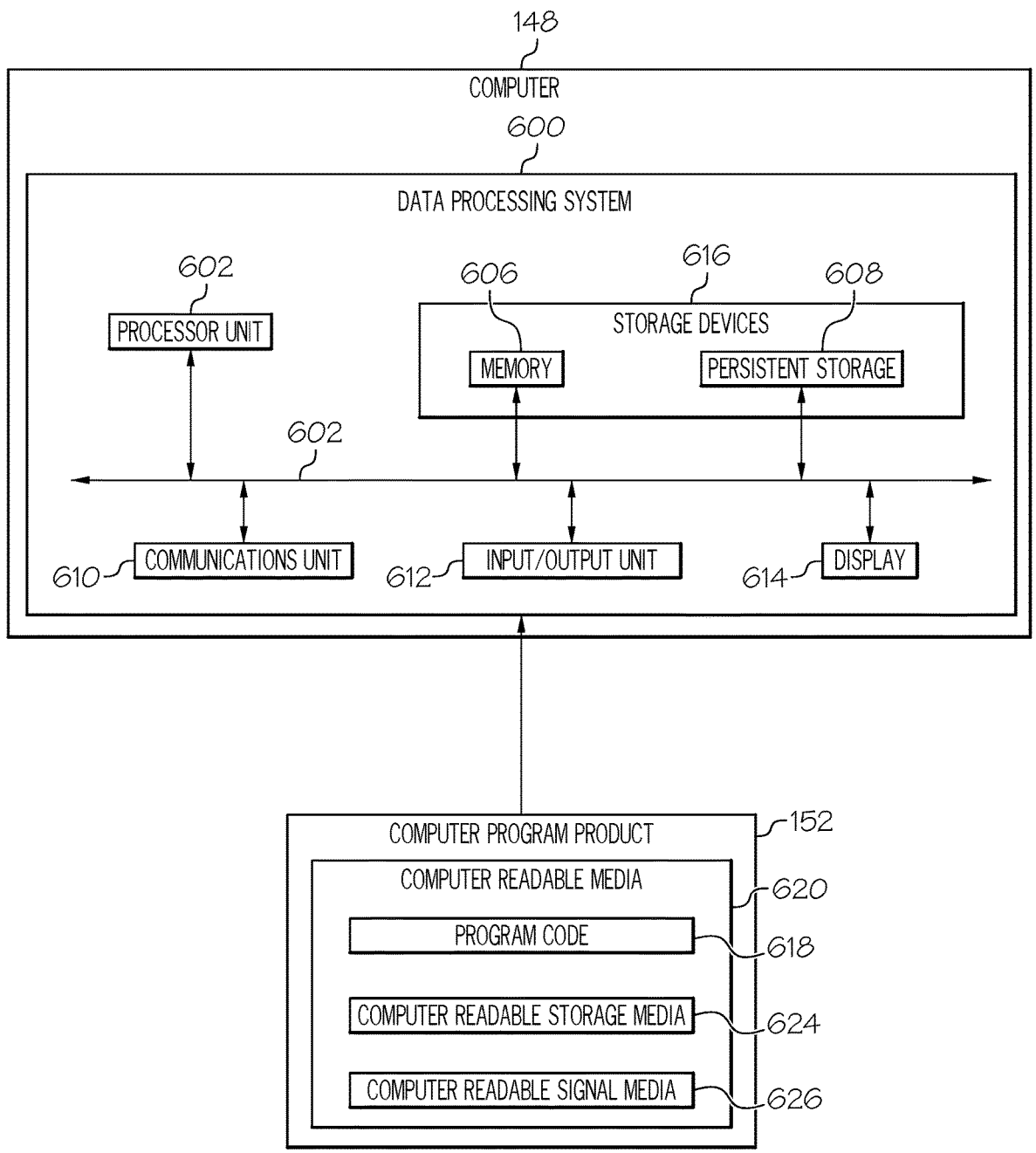
FIG. 10 is a schematic block diagram of one embodiment of a data processing system.

FIG. 10 illustrates one embodiment of data processing system 600. Data processing system 600 may be an example of a data processing system used to perform functions provided by computers 148 of computer system 146 (FIG. 1). Data processing system 600 may include communications bus 602, which provides communications between processor unit 604, memory 606, persistent storage 608, communications unit 610, input/output ("I/O") unit 612, and display 614.

Communications bus 602 may include one or more buses, such as a system bus or an input/output bus. Communications bus 602 may be implemented using any suitable type of architecture that provides for a transfer of data between different components or devices attached to the bus system.

Processor unit 604 may serve to execute instructions for software that may be loaded into memory 606. Processor unit 604 may be one or more processors or may be a multi-processor core, depending on the particular implementation. As one example, processor unit 604 may be implemented using one or more heterogeneous processor systems, in which a main processor is present with secondary processors on a single chip. As another example, processor unit 604 may be a symmetric multi-processor system containing multiple processors of the same type.

Memory 606 and persistent storage 608 may be examples of storage devices 616. Storage device 616 may be any piece of hardware that is capable of storing information including, but not limited to, data, program code in functional form, and/or other suitable information either on a temporary basis and/or a permanent basis. For example, memory 606 may be a random access memory or any other suitable volatile or non-volatile storage device.

Persistent storage 608 may take various forms, depending on the particular implementation. Persistent storage 608 may contain one or more components or devices. For example, persistent storage 608 may be a hard drive, a flash memory, a rewritable optical disk, a rewritable magnetic tape, or some combination thereof. The media used by persistent storage 608 may be removable. For example, a removable hard drive may be used for persistent storage 608.

Communications unit 610 may provide for communication with other data processing systems or devices. As one example, communications unit 610 may include a network interface card. As another example, communications unit 610 may include one or more devices used to transmit and receive data, such as a modem or a network adapter. Communications unit 610 may provide communications through the use of wired and/or wireless communications links.

Input/output unit 612 may allow for the input and output of data with other devices connected to data processing system 600. For example, input/output unit 612 may provide a connection for input through a keyboard, a mouse, and/or some other suitable input device. Further, input/output unit 612 may send output to a printer and/or display 614. Display 614 may provide a mechanism to display information.

Instructions for the operating system, applications, and/or programs may be located in storage devices 616, which are in communication with processor unit 604 through communications bus 602. As one example, the instructions are in a functional form on persistent storage 608. The instructions may be loaded into memory 606 for execution by processor unit 604. The processes of the different embodiments may be performed by processor unit 604 using computer implemented instructions, which may be located in a memory, such as memory 606.

The instructions may be referred to as program code, computer usable program code, or computer readable program code that may be read and executed by a processor in processor unit 604. The program code, in the different embodiments, may be embodied on different physical or computer readable storage media, such as memory 606 or persistent storage 608.

Program code 618 may be located in a functional form on the computer readable media 620 that is selectively removable and may be loaded onto or transferred to data processing system 600 for execution by processor unit 604. Program code 618 and computer readable media 620 may form computer program product 152. In one example, computer readable media 620 may be computer readable storage media 624 or computer readable signal media 626.

Computer readable storage media 624 may include, but is not limited to, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage, such as a hard drive, a thumb drive, or a flash memory that is connected to data processing system 600. In some instances, computer readable storage media 624 may not be removable from data processing system 600.

Alternatively, program code 618 may be transferred to data processing system 600 using computer readable signal media 626. For example, computer readable signal media 626 may be a propagated data signal containing program code 618. Computer readable signal media 626 may include, but is not limited to, an electromagnetic signal, an optical signal, and/or any other suitable type of signal. These signals may be transmitted over communications links, such as wireless communications links, a wire, an optical fiber cable, a coaxial cable, and/or any other suitable type of communications link.

In one example embodiment, program code 618 may be downloaded (e.g., over a network) to persistent storage 608 from another device or data processing system through computer readable signal media 626 for use within data processing system 600. For example, program code stored in computer readable storage media in a server data processing system may be downloaded over a network from the server to data processing system 600. The data processing system providing program code 618 may be a server computer, a client computer, or some other device capable of storing and transmitting program code 618.

Figure 11:
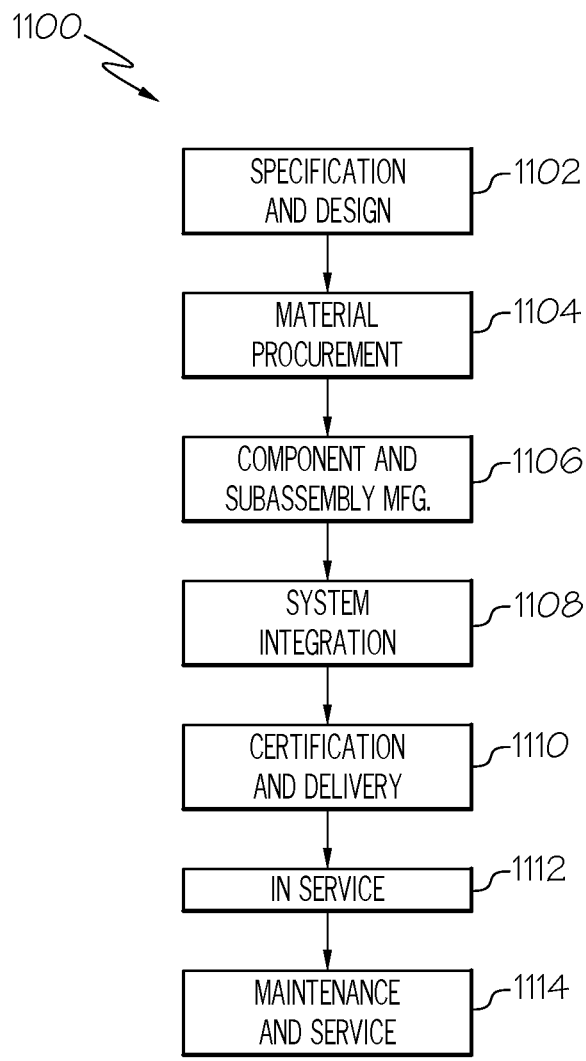
FIG. 11 is a block diagram of aircraft production and service methodology.

The illustrated embodiment of data processing system 600 in FIG. 11 is not meant to provide physical or architectural limitations to the manner in which different embodiments may be implemented. Other components in addition to and/or in place of the ones illustrated may be used. Some components may be unnecessary in some example embodiments. Also, the blocks are presented to illustrate some functional components. One or more of these blocks may be combined and/or divided into different blocks when implemented in different example embodiments.

Figure 12:
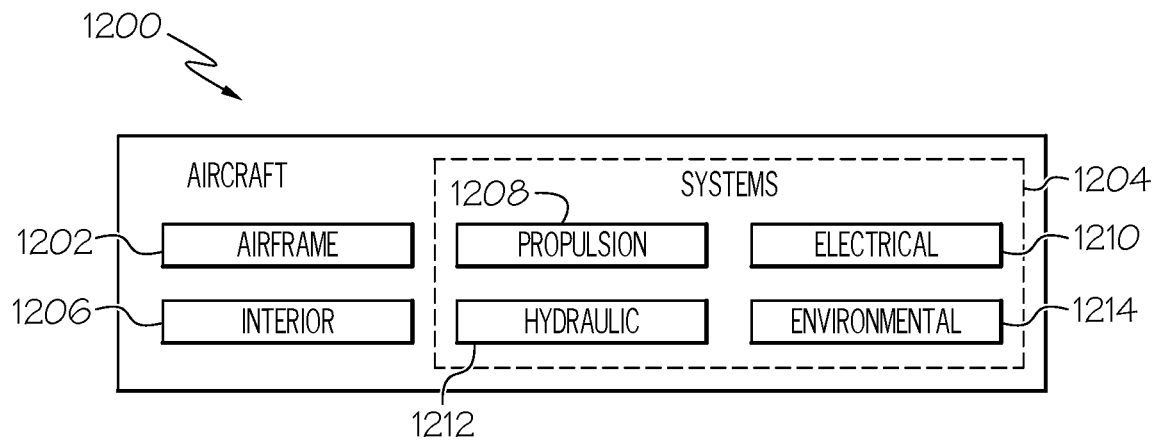
FIG. 12 is a schematic illustration of an aircraft.

Examples of the present disclosure may be described in the context of aircraft manufacturing and service method 1100 as shown in FIG. 11 and aircraft 1200 as shown in FIG. 12. During pre-production, the illustrative method 1100 may include specification and design, as shown at block 1102, of aircraft 1200 and material procurement, as shown at block 1104. During production, component and subassembly manufacturing, as shown at block 1106, and system integration, as shown at block 1108, of aircraft 1200 may take place. Thereafter, aircraft 1200 may go through certification and delivery, as shown block 1110, to be placed in service, as shown at block 1112. While in service, aircraft 1200 may be scheduled for routine maintenance and service, as shown at block 1114. Routine maintenance and service may include modification, reconfiguration, refurbishment, etc. of one or more systems of aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 12, aircraft 1200 produced by illustrative method 1100 may include airframe 1202 with a plurality of high-level systems 1204 and interior 1206. Examples of high-level systems 1204 include one or more of propulsion system 1208, electrical system 1210, hydraulic system 1212 and environmental system 1214. Any number of other systems may be included. Although an aerospace example is shown, the principles disclosed herein may be applied to other industries, such as the automotive and marine industries.

The apparatus and methods shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while aircraft 1200 is in service (block 1112). Also, one or more examples of the apparatus and methods, or combination thereof may be utilized during production stages (blocks 1108 and 1110), for example, by substantially reducing the risks associated with counterfeit components in aircraft manufacturing and service processes. Similarly, one or more examples of the apparatus and methods, or a combination thereof, may be utilized, for example and without limitation, while aircraft 1200 is in service (block 1112) and during maintenance and service stage (block 1114).

Although various embodiments of the disclosed apparatus and methods have been shown and described, modifications may occur to those skilled in the art upon reading the specification. The present application includes such modifications and is limited only by the scope of the claims.

What is claimed is:

1. An additively manufactured three-dimensional article comprising:
an article body comprising layers successively built up from a metal powder using an additive manufacturing process by scanning a first portion of said metal powder with electromagnetic radiation, wherein each one of said layers comprises a layer microstructure established by a first melting profile of said first portion of said metal powder; and
an anti-counterfeiting mark formed in at least one of said layers during said additive manufacturing process by scanning a second portion of said metal powder with said electromagnetic radiation, wherein said anti-counterfeiting mark comprises an anti-counterfeiting mark microstructure established by a second melting profile of said second portion of said metal powder,
wherein said anti-counterfeiting mark microstructure is different than said layer microstructure.

2. The article of claim 1 wherein said at least one of said layers is
a topmost layer of said layers.

3. The article of claim 1 wherein said anti-counterfeiting mark microstructure comprises a microscopically perceptible variation compared to said layer microstructure.

4. The article of claim 3 wherein said anti-counterfeiting mark is only visible under at least a 25× magnification.

5. The article of claim 1 wherein said anti-counterfeiting mark comprises at least one of an image, a symbol, a string of one or more alphabetic characters, a string of one or more numeric characters, and a bar code.

6. The article of claim 1 wherein said anti-counterfeiting mark comprises at least one branding element for authenticating said article.

7. The article of claim 1 wherein said anti-counterfeiting mark extends through at least a portion of a thickness of said at least one of said layers.

8. The article of claim 1 wherein said anti-counterfeiting mark comprises a thickness of at least 0.010 inch.

9. The article of claim 1 wherein:
said first melting profile of said first portion of said metal powder is selectively controlled by at least one process parameter of said additive manufacturing process; and
said second melting profile of said second portion of said metal powder is selectively controlled by a modification of said at least process parameter of said additive manufacturing process.

10. The article of claim 9 wherein said at least one process parameter comprises a direction of said electromagnetic radiation.

11. The article of claim 10 wherein said at least one process parameter further comprises at least one of a power level of said electromagnetic radiation, a scanning velocity of said electromagnetic radiation, and a focal offset value.

12. The article of claim 1 wherein said at least one of said layers comprises a tab extending from said article body, and wherein said anti-counterfeiting mark is formed in said tab.

13. An additively manufactured three-dimensional article comprising:
an article body comprising layers successively built up from a metal powder using an additive manufacturing process by scanning a first portion of said metal powder with electromagnetic radiation;
an anti-counterfeiting mark formed in at least one of said layers during said additive manufacturing process by scanning a second portion of said metal powder with said electromagnetic radiation; and wherein:
each one of said layers comprises a layer microstructure established by a first melting profile of said first portion of said metal powder;
said anti-counterfeiting mark comprises an anti-counterfeiting mark microstructure established by a second melting profile of said second portion of said metal powder; and
said anti-counterfeiting mark microstructure comprises a variation in at least one of grain structure and grain orientation compared to said layer microstructure.

14. The article of claim 13 wherein said first melting profile and said second melting profile are selectively controlled by modifying at least one of a direction of said electromagnetic radiation, a melting speed of said metal powder, a power level of said electromagnetic radiation, a melting temperature of said metal powder, a hold temperature of said metal powder upon melting, a hold time of said metal powder upon melting, a cool down time to solidify said metal powder following melting, a scanning velocity of said electromagnetic radiation, and a focal offset value.

15. The article of claim 13 wherein:
said variation in at least one of said grain structure and said grain orientation between said anti-counterfeiting mark microstructure and said layer microstructure extends through at least a portion of a thickness of said article body.

16. The article of claim 13 wherein said anti-counterfeiting mark comprises at least one of an image, a symbol, a string of one or more alphabetic characters, a string of one or more numeric characters, a bar code, and a branding element for authenticating said article.

17. The article of claim 13 wherein:
said at least one of said layers comprises a tab extending from said article body;
said anti-counterfeiting mark is formed in said tab; and
said tab is removable from the article body.

18. The article of claim 9 wherein said at least one process parameter comprises at least one of a melting speed of said metal powder, a melting temperature of said metal powder, a hold temperature of said metal powder upon melting, a hold time of said metal powder upon melting, and a cool down time to solidify said metal powder following melting.

19. The article of claim 1 wherein:
said at least one of said layers, in which the anti-counterfeiting mark is formed, comprises a plurality of said layers; and
said anti-counterfeiting mark extends through at least a portion of a thickness of said article body.

20. The article of claim 1 wherein:
said layer microstructure comprises a first grain structure and a first grain orientation;
said anti-counterfeiting mark microstructure comprises a second grain structure and second grain orientation; and
at least one of:
   said first grain structure and said second grain structure are different; and
   said first grain orientation and said second grain orientation are different.

* * * * *